U̇nited States Patent Office 3,838,126
Patented Sept. 24, 1974

3,838,126
BRONCHODILATING TETRAZOLO(1,5-c)
QUINAZOLIN-5(6H)-ONES
Eugene R. Wagner, Midland, Mich., assignor to The Dow Chemical Company, Midland, Mich.
No Drawing. Filed Oct. 13, 1972, Ser. No. 297,466
Int. Cl. C07d 51/46
U.S. Cl. 260—256.4 F        9 Claims

ABSTRACT OF THE DISCLOSURE

Tetrazoloquinazolinone compounds such as 8,9 - dichloro-tetrazolo(1,5 - c)quinazolin-5(6H)-one are prepared by the reaction of a 2-amino phenyltetrazole amine salt with phosgene. The compounds are useful as bronchodilator agents.

SUMMARY OF THE INVENTION

This invention is directed to tetrazoloquinazolinone compounds and is particularly directed to tetrazolo(1,5-c)quinazolin-5(6H)-one compounds of the formula:

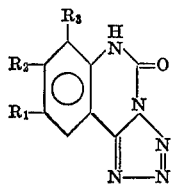

wherein $R_1$, $R_2$ and $R_3$ each independently represent hydrogen, lower alkyl, lower alkoxy, halo, trihalomethyl or nitro, and $R_1$ and $R_2$ taken together when $R_3$ is hydrogen represent methylenedioxy. The terms "lower alkyl" and "lower alkoxy" are employed to refer to such moieties having from one to three carbon atoms, and the term halo is employed to designate chloro, fluoro, and bromo. The compounds are crystalline solids which are insoluble in many organic liquids and which are soluble in aqueous alkali solutions. For convenience they are hereinafter referred to as "tetrazoloquinazolinones."

The tetrazoloquinazolinone compounds are useful for administration to animals in studying the respiratory system thereof and are particularly useful as bronchodilators or as antagonists of agents such as histamine, serotonin, acetylcholine and the like.

The compounds of the invention are prepared by the reaction of phosgene with a substituted 5-(2-aminophenyl)tetrazole corresponding to the formula

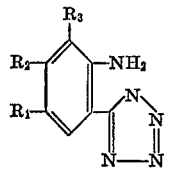

wherein $R_1$, $R_2$ and $R_3$ have the significance set out above, or a triloweralkylamine salt of such a tetrazole. The trialkylamine salt reactants are conveniently prepared by the reaction of an amine such as triethylamine with the substituted 5-(2-aminophenyl)tetrazole. The tetrazoles can be prepared by the reaction of the corresponding anthranilonitrile with sodium azide and ammonium chloride, by the method of Finnegan et al., J. Am. Chem. Soc. 80, 3908 (1958) with the addition of lithium chloride, according to Holland and Pereira, J. Med. Chem. 10, 149 (1967). The anthranilonitriles can be prepared by known methods, McKee et al., J. Am. Chem. Soc. 68, 1902 (1946), and 69, 940 (1947) and Keiffler, J. Chem. Soc., 119, 1476 (1921).

The reaction proceeds when the reactants are mixed together in an inert organic liquid such as methylene chloride, as a reaction medium. The reaction proceeds readily at temperatures from about 0° to about 75° C. and is conveniently carried out at ambient temperatures. An alkali metal carbonate or hydroxide or an amine may be added to the mixture as a hydrogen halide acceptor and is particularly useful when the tetrazole reactant is employed as the free tetrazole. However, when the tetrazole reactant is employed as a trialkylamine salt, the reaction proceeds equally well without an additional hydrogen halide acceptor. The exact proportions of the reactants to be employed are not critical, some of the desired product being obtained when the reactants are combined over a wide range of proportions. However, the reaction consumes the reactants in equimolar proportions and the use of the reactants in such proportions, or with an excess of phosgene, is preferred. The reactants are preferably mixed by passing excess phosgene through a dispersion of the 5-(2-aminophenyl) tetrazole salt in the liquid reaction medium. The reaction is generally complete in about 5 to 30 minutes, and the progress of the reaction can be followed by monitoring the production of trialkylamine hydrochloride or reaction or chloride salt of the hydrogen halide acceptor. The product precipitates in the reaction mixture either spontaneously or addition of aqueous acid and can be separated by conventional procedures such as decantation, filtration or centrifugation. The product can be purified by conventional procedures such as recrystallization from large volumes of acetone and washing. The product thus obtained can be administered to animals or further purified by conventional procedures.

DESCRIPTION OF THE PREFERRED EMBODIMENTS

The following examples illustrate the invention but are not to be construed as limiting the same.

Example 1

5-(2-aminophenyl)tetrazole (1 gram) was dispersed in 75 milliliters of benzene with stirring. Gaseous phosgene was bubbled through the mixture for one minute during which time a white solid formed. 2-3 grams of potassium carbonate was added, then gaseous phosgene introduction was resumed for one minute. 50 milliliters of water were added to the mixture. The resulting mixture was filtered and the solid on the filter was washed with water and then with ethanol. The product (about 0.35 grams), was dissolved in 100 milliliters of acetone and boiled until crystals began to form (at which time the volume remaining was about 30 milliliters). The mixture was cooled to room temperature and then filtered, to obtain 0.22 grams of the tetrazolo(1,5-c)quinazolin-5(6H)-one product. The product was found to melt at 273°–275° C.

Example 2

A series of tetrazolo(1,5-c)quinazolin-5(6H)-ones was prepared by the reaction of gaseous phosgene with solutions of the triethylamine salt of various 5-(2-aminophenyl)tetrazoles in methylene chloride. In each case, a methylene chloride solution of two molar proportions of triethylamine per molar proportion of the 5-(2-aminophenyl)tetrazole was prepared. The resulting solution was stirred and mixed with gaseous phosgene for 5–10 minutes or until the resulting cloud of triethylamine hydrochloride disappeared from above the solution. The reaction mixture was stirred at room temperature for 15 minutes and the dilute aqueous hydrochloric acid was added until formation of a precipitate was complete. The mixture was filtered; the filter cake was washed with water, and the product recrystallized from large volumes of acetone in a manner similar to that described in Example 1. The product could be decolorized with charcoal in conventional procedures to remove the dark colored impurities when present. Once the compound went into solution, the acetone could usually be concentrated considerably before crystals began to form.

In this manner compounds listed in the following table were prepared. In the table, the tetrazoloquinazolinone compounds are identified by the $R_1$, $R_2$ and $R_3$ substituents corresponding to Formula I. The substituted 5-(2-aminophenyl)tetrazole starting materials corresponding to Formula II are thus also identified by the $R_1$, $R_2$ and $R_3$ moieties.

| $R_1$ | $R_2$ | $R_3$ | M.P., °C. | Calc'd analysis | Found analysis |
|---|---|---|---|---|---|
| H | H | H | 273-5 | C, 51.34; H, 2.69; N, 37.42. | C, 51.12; H, 2.85; N, 37.91. |
| H | Cl | H | 262-3 | C, 43.36; H, 1.82; Cl, 16.00. | C, 43.34; H, 2.29; Cl, 15.99. |
| H | CH₃ | H | 260-1 | C, 53.73; H, 3.51; N, 34.81. | C, 54.30; H, 3.66; N, 35.21. |
| OCH₃ | OCH₃ | H | 275-6 | C, 48.53; H, 3.67; N, 28.33. | C, 48.94; H, 3.77; N, 28.46. |
| Cl | H | H | 280-1 | C, 43.36; H, 1.82; N, 31.60. | C, 43.25; H, 1.87; N, 31.66. |
| NO₂ | H | H | 272-3 | C, 41.39; H, 1.74; N, 36.20. | C, 40.99; H, 1.71; N, 36.18. |
| —O—CH₂—O— | | H | 275-6 | C, 46.76; H, 2.18; N, 30.30. | C, 46.64; H, 2.12; N, 30.48. |
| Cl | Cl | H | 272-3 | C, 37.5; H, 1.18; N, 27.35. | C, 37.8; H, 1.31; N, 27.4. |
| H | OCH₃ | H | 268 | C, 49.77; H, 3.25; N, 32.25. | C, 49.80; H, 3.37; N, 32.13. |
| H | H | Cl | 252-3 | C, 43.36; H, 1.82; Cl, 16.00; N, 31.60. | C, 42.99; H, 1.85; Cl, 15.92; N, 30.75. |
| H | CF₃ | H | 248 | C, 42.36; H, 1.58; N, 27.45. | C, 41.32; H, 1.33; N, 27.62. |

¹ Decomposes.

The compounds of the invention can be administered to animals in the study of chemical effects on the respiratory system, and as bronchodilators. The compounds are typically administered to mammals at varying dosage rates depending upon route, size, age and species of animal; and effect to be produced. They can be formulated and administered according to known procedures.

Bronchodilator activity of representative tetrazoloquinazolinone compounds is examined in the Konzett-Rossler guinea pig preparation according to accepted procedures. See Konzett and Rossler; Arch. f. exp. Path. u. Pharmakol,. *195*: 71–74 (1940); and Rosenthale and Dervinis, Arch. int. Pharmacodyn, *172*: 91–94 (1968). In this procedure, an anesthetized guinea pig is artificially respired with a fixed volume of air. This volume of air is selected to exceed the lung capacity, and the excess "overflow" volume is measured. Bronchoconstriction is produced by intravenous injection of a selected agonist (histamine, serotonin or acetylcholine) at five minute intervals at a dosage selected to produce 50 to 80 percent bronchoconstriction, as indicated by the resultant increase in "overflow" volume. Test compounds are evaluated by administering a test compound two minutes before the next agonist dose following three previous agonist doses resulting in relatively uniform (±10 percent) bronchoconstriction. Bronchodilator activity, indicated by ability of a test compound to block the agonist response, is expressed in terms of percent (%) block, calculated by dividing the agonist response(s) after the test drug by the average of the three agonist response preceding the test compound, multiplying by 100 and subtracting this value from 100%. Aminophylline, a known bronchodilator, is also employed as a standard for comparison. In such procedure percent block is determined for an intravenous dosage of 10 milligrams aminophylline per kilogram, then a test compound, then a repeat dosage of aminophylline. The results can be expressed as a percent of aminophylline, calculated by expressing the percent blockade produced by the compound as a percentage of the average of the percent blockade produced by the doses of aminophylline which precede and follow it.

In replicate operations according to this procedure and at a dosage rate of 10 milligrams per kilogram, the compounds:

tetrazolo(1,5-c)quinazolin-5(6H)-one,
7-chloro-tetrazolo(1,5-c)quinazolin-5(6H)-one,
8-chloro-tetrazolo(1,5-c)quinazolin-5(6H)-one,
8,9-dichloro-tetrazolo(1,5-c)quinazolin-5(6H)-one,
8-methyl-tetrazolo(1,5-c)quinazolin-5(6H)-one,
8,9-dimethoxy-tetrazolo(1,5-c)quinazolin-5(6H)-one,
8-trifluoromethyl-tetrazolo(1,5-c)quinazolin-5(6H)-one,
9-nitro-tetrazolo(1,5-c)quinazolin-5(6H)-one, and
8,9-methylenedioxy-tetrazolo(1,5-c)quinazolin-5(6H)-one, are found to give average percent block results of 70, 72, 66, 65, 43, 78, 91, 40, and 50, respectively and to be 108, 93, 136, 95, 67, 134, 114, 79, and 87 percent, respectively, as effective as aminophylline in blocking the bronchoconstriction induced by histamine.

In similar operations, 8,9-dimethoxytetrazolo(1,5-c)-quinazolin - 5(6H)-one, and 8-methoxytetrazolo(1,5-c) quinazolin - 5(6H) - one give bronchodilator responses equal to or greater than the responses produced by aminophylline against serotonin and acetylcholine.

What is claimed is:

1. A tetrazolo(1,5-c)quinazolin - 5(6H) - one compound corresponding to the formula:

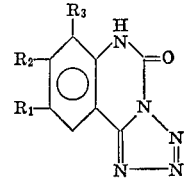

wherein $R_1$, $R_2$ and $R_3$ each independently represent hydrogen, lower alkyl, lower alkoxy, halo, trihalomethyl or nitro, and $R_1$ and $R_2$ taken together when $R_3$ is hydrogen represent methylenedioxy.

2. A compound of Claim 1 wherein $R_3$ is hydrogen.

3. A compound of Claim 1 wherein $R_1$ and $R_2$ both represent lower alkoxy.

4. A compound of Claim 2 wherein $R_1$ and $R_2$ both represent methoxy.

5. A compound of Claim 2 wherein $R_1$ and $R_2$ both represent chloro.

6. A compound of Claim 2 wherein $R_1$ is hydrogen and $R_2$ is methoxy.

7. A compound of Claim 2 wherein $R_1$ is hydrogen and $R_2$ is chloro.

8. A compound of Claim 2 wherein $R_1$ is hydrogen and $R_2$ is trifluoromethyl.

9. A compound of Claim 1 wherein $R_1$, $R_2$ and $R_3$ all represent hydrogen.

References Cited
UNITED STATES PATENTS
3,389,137   6/1968   Mosby et al. _____ 260—256.4

RAYMOND V. RUSH, Primary Examiner

U.S. Cl. X.R.
424—251